United States Patent
Wu

(10) Patent No.: US 11,538,190 B2
(45) Date of Patent: Dec. 27, 2022

(54) IMAGE ANALYZING METHOD OF INCREASING ANALYSIS ACCURACY AND RELATED IMAGE MONITORING APPARATUS

(71) Applicant: VIVOTEK INC., New Taipei (TW)

(72) Inventor: Jen-Chih Wu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 65 days.

(21) Appl. No.: 17/098,474

(22) Filed: Nov. 16, 2020

(65) Prior Publication Data

US 2021/0174546 A1 Jun. 10, 2021

(30) Foreign Application Priority Data

Dec. 4, 2019 (TW) ................................. 108144238

(51) Int. Cl.
| | | |
|---|---|---|
| *G06T 7/80* | (2017.01) | |
| *G06T 7/35* | (2017.01) | |
| *G06T 5/50* | (2006.01) | |
| *G06T 7/00* | (2017.01) | |

(52) U.S. Cl.
CPC ................. *G06T 7/80* (2017.01); *G06T 5/50* (2013.01); *G06T 7/35* (2017.01); *G06T 7/97* (2017.01); *G06T 2207/20084* (2013.01)

(58) Field of Classification Search
CPC .... G06T 7/80; G06T 5/50; G06T 7/35; G06T 7/97; G06T 2207/20084; G06T 7/00
See application file for complete search history.

(56) References Cited

U.S. PATENT DOCUMENTS

| | | | | |
|---|---|---|---|---|
| 2010/0086182 A1* | 4/2010 | Luo | ........................... | G06T 7/12 382/128 |
| 2011/0157409 A1* | 6/2011 | Adachi | ..................... | G09G 5/00 348/222.1 |
| 2011/0298944 A1* | 12/2011 | Kuo | .................... | H04N 9/04557 382/167 |
| 2018/0295309 A1* | 10/2018 | Kuriyama | .............. | H04N 5/378 |
| 2019/0174114 A1* | 6/2019 | Mun | ..................... | H04N 13/194 |
| 2020/0007738 A1* | 1/2020 | Chu | ....................... | H04N 5/2355 |
| 2021/0073987 A1* | 3/2021 | Tegzes | ....................... | G06T 7/11 |

FOREIGN PATENT DOCUMENTS

| | | |
|---|---|---|
| TW | 200939779 | 9/2009 |
| TW | 201419846 A | 5/2014 |

* cited by examiner

*Primary Examiner* — Chan S Park
*Assistant Examiner* — Daniel C Chang
(74) *Attorney, Agent, or Firm* — Winston Hsu

(57) ABSTRACT

An image analyzing method of increasing analysis accuracy is applied to an image monitoring apparatus with a processor. The image analyzing method is executed by the first processor and includes receiving statistic data of an external electronic unit, transforming the statistic data into feedback data via specific algorithm, and generating a control parameter according to the feedback data. The control parameter is used to optimize image data output by the image monitoring apparatus.

10 Claims, 9 Drawing Sheets

IMAGE ANALYZING METHOD OF INCREASING ANALYSIS ACCURACY AND RELATED IMAGE MONITORING APPARATUS

BACKGROUND OF THE INVENTION

1. Field of the Invention

The present invention relates to an image analyzing method and an image monitoring apparatus, and more particularly, to an image analyzing method of increasing analysis accuracy and a related image monitoring apparatus.

2. Description of the Prior Art

Conventional image analysis technique utilizes an image processing unit to receive output data from an image sensor, and the image processing unit generates and transmits statistic data to an automatic calibration module of a central processing unit or a graphic processing unit. The automatic calibration module analyzes the statistic data to acquire a plurality of control parameters. The control parameters are transmitted to the image sensor and the image processing unit. The image processing unit outputs several image data respectively used to be an image stream displayed on a displaying unit and be executed by image content analysis of the system. The automatic calibration module of the conventional image analysis technique generates the control parameter only according to the statistic data of the image processing unit, and therefore the control parameter cannot correctly indicate environmental factors of the image monitoring apparatus. For example, if the image monitoring apparatus is in the shining scene, the image processing unit may misjudge the control parameter and output the low-illumination image data; when the scene is changed, the conventional image analysis technique cannot immediately and accurately adjust the image quality according to the scene change, and cannot provide the image with preferred optimizing quality.

SUMMARY OF THE INVENTION

The present invention provides an image analyzing method of increasing analysis accuracy and a related image monitoring apparatus for solving above drawbacks.

According to the claimed invention, an image analyzing method of increasing analysis accuracy is applied to a first processor of an image monitoring apparatus. The image analyzing method includes receiving statistic data from an external electronic unit, transforming the statistic data into feedback data via specific algorithm, and generating a control parameter according to the feedback data and utilizing the control parameter to optimize image data output by the image monitoring apparatus.

According to the claimed invention, an image analyzing method of increasing analysis accuracy is applied to a first processor of an image monitoring apparatus. The image analyzing method receiving statistic data from an external electronic unit, utilizing specific algorithm to generate a first control parameter and a second control parameter according to the statistic data and a predefined condition, and acquiring first image data generated by the first control parameter to display on a displaying unit, and further acquiring second image data generated by the second control parameter for image content analysis.

According to the claimed invention, an image monitoring apparatus of increasing analysis accuracy includes a first processor electrically connected to an external electronic unit that provides statistic data, the first processor is adapted to receive statistic data from an external electronic unit, transform the statistic data into feedback data via specific algorithm, and generate a control parameter according to the feedback data and utilize the control parameter to optimize image data output by the image monitoring apparatus.

According to the claimed invention, an image monitoring apparatus of increasing analysis accuracy includes a first processor electrically connected to an external electronic unit that provides statistic data, the first processor is adapted to receive statistic data from an external electronic unit, utilize specific algorithm to generate a first control parameter and a second control parameter according to the statistic data and a predefined condition, and acquire first image data generated by the first control parameter to display on a displaying unit and further acquiring second image data generated by the second control parameter for image content analysis.

The image monitoring apparatus and the image analyzing method of the present invention can utilize the specific algorithm to provide the feedback data in the automatically generating manner or in the manually inputting manner. The specific algorithm can include, but not be limited to, the automatic calibration function and the image content analysis function, so that the image sensor and the image processing unit can refer to the scene or the light source or any external environmental factors when analyzing the image content, and provide different image quality in accordance with the actual demands. The present invention can not only increase the accuracy of the image content analysis, but also improve the quality of the image stream watched by the user. The above-mentioned four embodiments can be intermixed with each other or applied individually; a combination of the four embodiments depends on the actual demand, and a detailed description is omitted herein for simplicity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
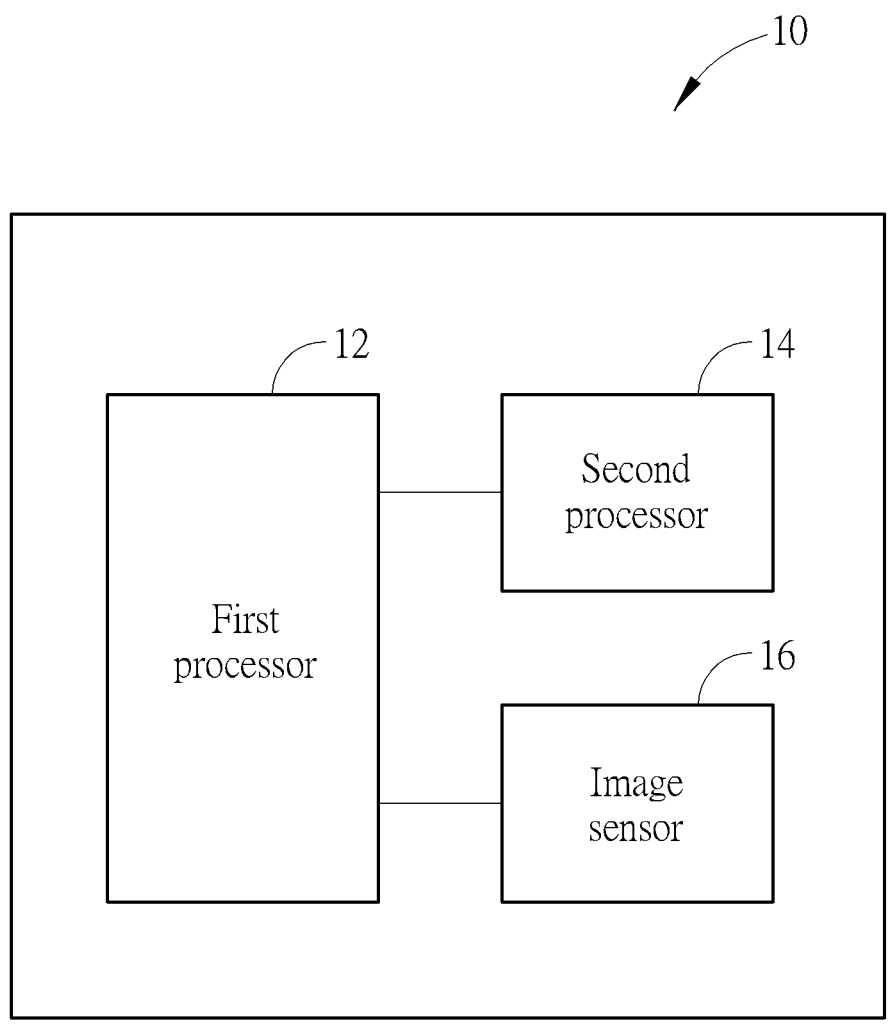
FIG. 1 is a functional block diagram of an image monitoring apparatus according to an embodiment of the present invention.

Please refer to FIG. 1. FIG. 1 is a functional block diagram of an image monitoring apparatus 10 according to an embodiment of the present invention. The image monitoring apparatus 10 can optionally include a first processor 12, a second processor 14 and an image sensor 16. The second processor 14 and the image sensor 16 may be interpreted as external electronic units, and the first processor 12 may be interpreted as an internal electronic unit. The second processor 14 and the image sensor 16 can be electrically connected to the first processor 12 in a wireless manner or in a wire manner. The first processor 12 can be a central processing unit (CPU) or a graphic processing unit (GPU), and adapted to receive statistic data from the second processor 14 and/or the image sensor 16 for executing a high-accuracy image analyzing function. The second processor 14 can be an image processing unit. Application of the processors is not limited to the above-mentioned examples, and the processor may be an application-specific integrated circuit (ASIC) or a field programmable gate array (FPGA), which depends on a design demand.

Figure 2:
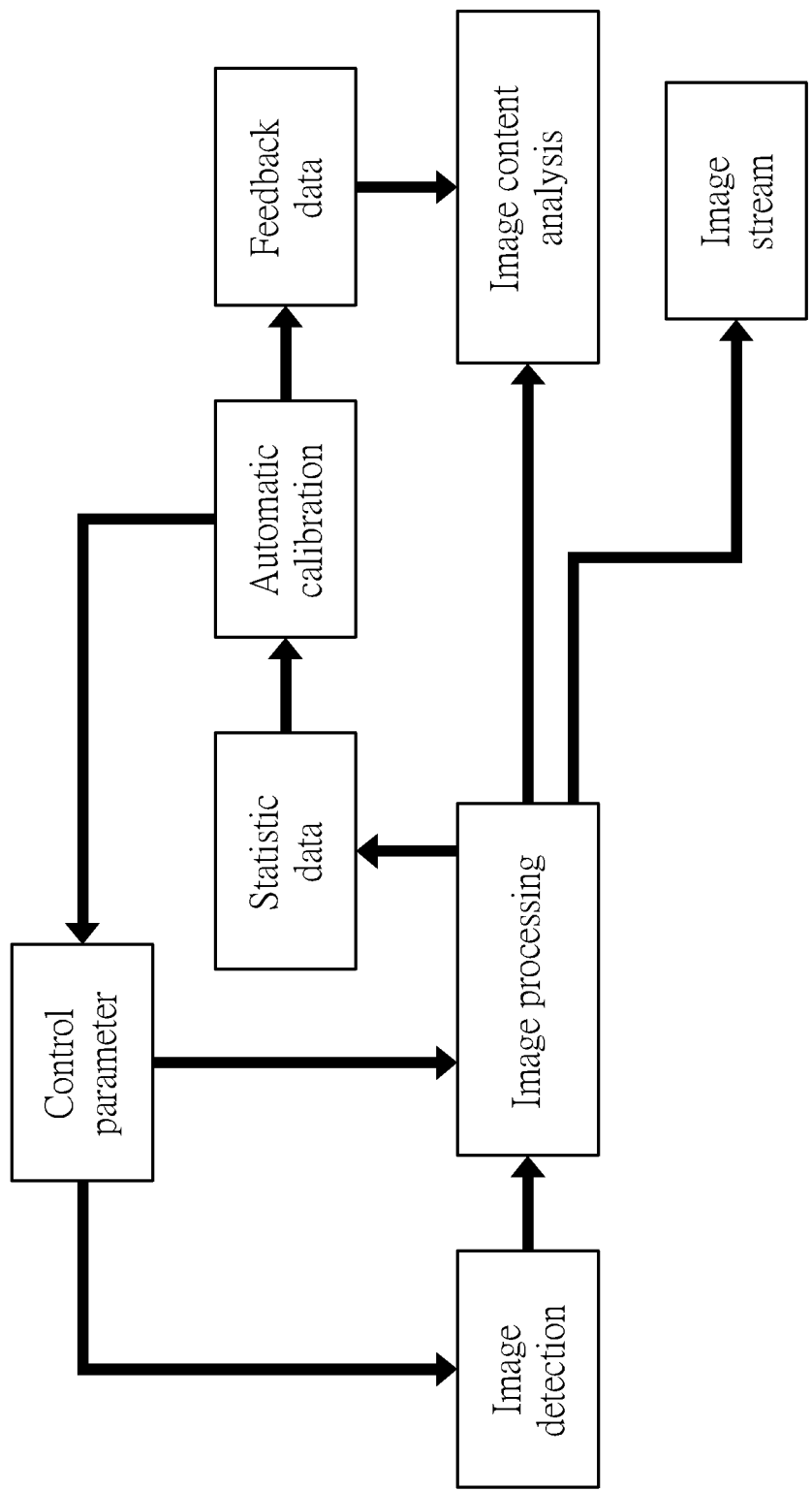
FIG. 2 is a functional block diagram of an image analyzing function according to a first embodiment of the present invention.
Figure 3:
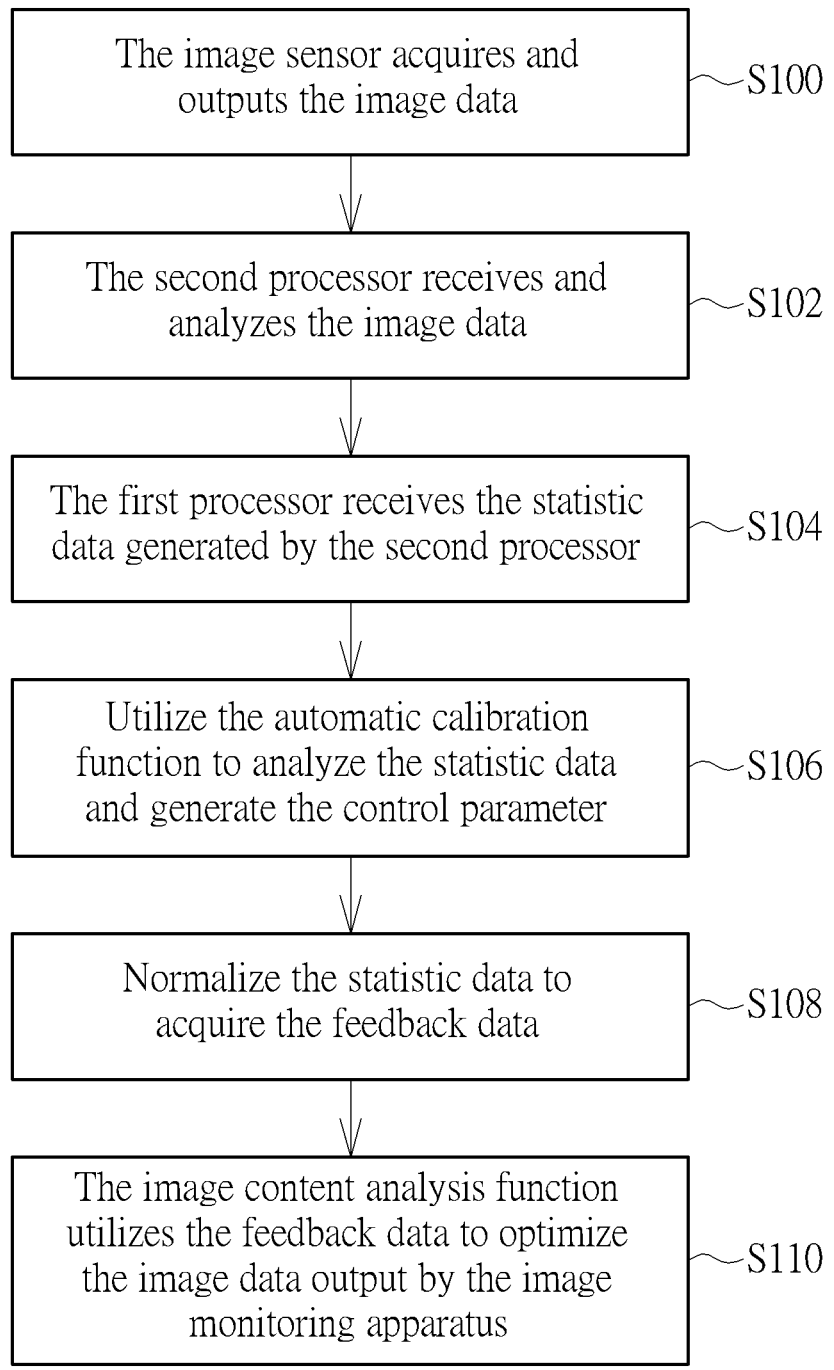
FIG. 3 is a flow chart of an image analyzing method according to the first embodiment of the present invention.

Please refer to FIG. 1 to FIG. 3. FIG. 2 is a functional block diagram of an image analyzing function according to a first embodiment of the present invention. FIG. 3 is a flow chart of an image analyzing method according to the first embodiment of the present invention. The image analyzing method illustrated in FIG. 3 can be suitable for the image monitoring apparatus 10 shown in FIG. 1. First, the image analyzing method executes steps S100 and S102 that the image sensor 16 can receive image data and output the image data to the second processor 14 for image processing. Then, step S104 is executed that the first processor 12 can receive statistic data generated by the second processor 14 in response to the image processing. Then, steps S106 and S108 are executed that the first processor 12 can utilize an automatic calibration function to analyze the statistic data and generate a control parameter, and further normalize the statistic data to acquire feedback data for optimal adjustment of image content analysis.

The control parameter can be, but not limited to, parameters as auto exposure (AE), gain, noise reduction (NR) or wide dynamic range (WDR). The control parameter can be transmitted to the second processor 14 and/or the image sensor 16 for adjusting details of image detection and image processing. The second processor 14 can provide the image data for being image stream and executing the image content analysis according to the control parameter and a sensing result of the image sensor 16. Generally, the image stream can be displayed on a displaying unit (which is not shown in the figures) of the image monitoring apparatus 10 for playback, preview or instantly play; the image content analysis is executed by the image monitoring apparatus 10 for automatic analysis of the image data. Thus, when the statistic data is analyzed by the automatic calibration function, information which is helpful to the image content analysis can be acquired, and the feedback data can be acquired via normalization and applied for the image content analysis function.

Final, step S110 is executed that the image content analysis function of the first processor 12 can utilize the feedback data to acquire a setting adjustment value as being related parameter of image analysis, and parameter setting of the image content analysis function can be dynamically adjusted via the related parameter of the image analysis, so as to optimize the image data output by the image monitoring apparatus 10 and increase accuracy and efficiency of the image content analysis. The image content analysis is automatically executed by system, instead of providing images for observation, so that parameters, such as brightness, image contrast, edge sharpness, of the image data are different from the image stream watched by the user; the image analyzing method of the present invention can generate the feedback data via foresaid reasons to increase accuracy of the image content analysis.

That is, the image analyzing function of the present invention can automatically adjust the parameter setting of the images to generate the image stream which is appropriate for user observation; the image analyzing function of the present invention further can automatically adjust image parameters as specific-type parameters for the image content analysis, so as to generate the image data suitable for the image content analysis and acquire the preferred accuracy of the image content analysis result. For example, the feedback data analyzed by the statistic data via the automatic calibration function of the first embodiment can be an average illumination of the image; when receiving the feedback data, the image content analysis function can determine whether the image monitoring apparatus 10 is in the daytime or night, shining place or the dark place and/or in the indoor or the outdoor according to the feedback data, and further can dynamically adjust illumination detection sensitivity (which means the foresaid parameter setting) for effectively increasing the accuracy of the image content analysis result.

Figure 4:
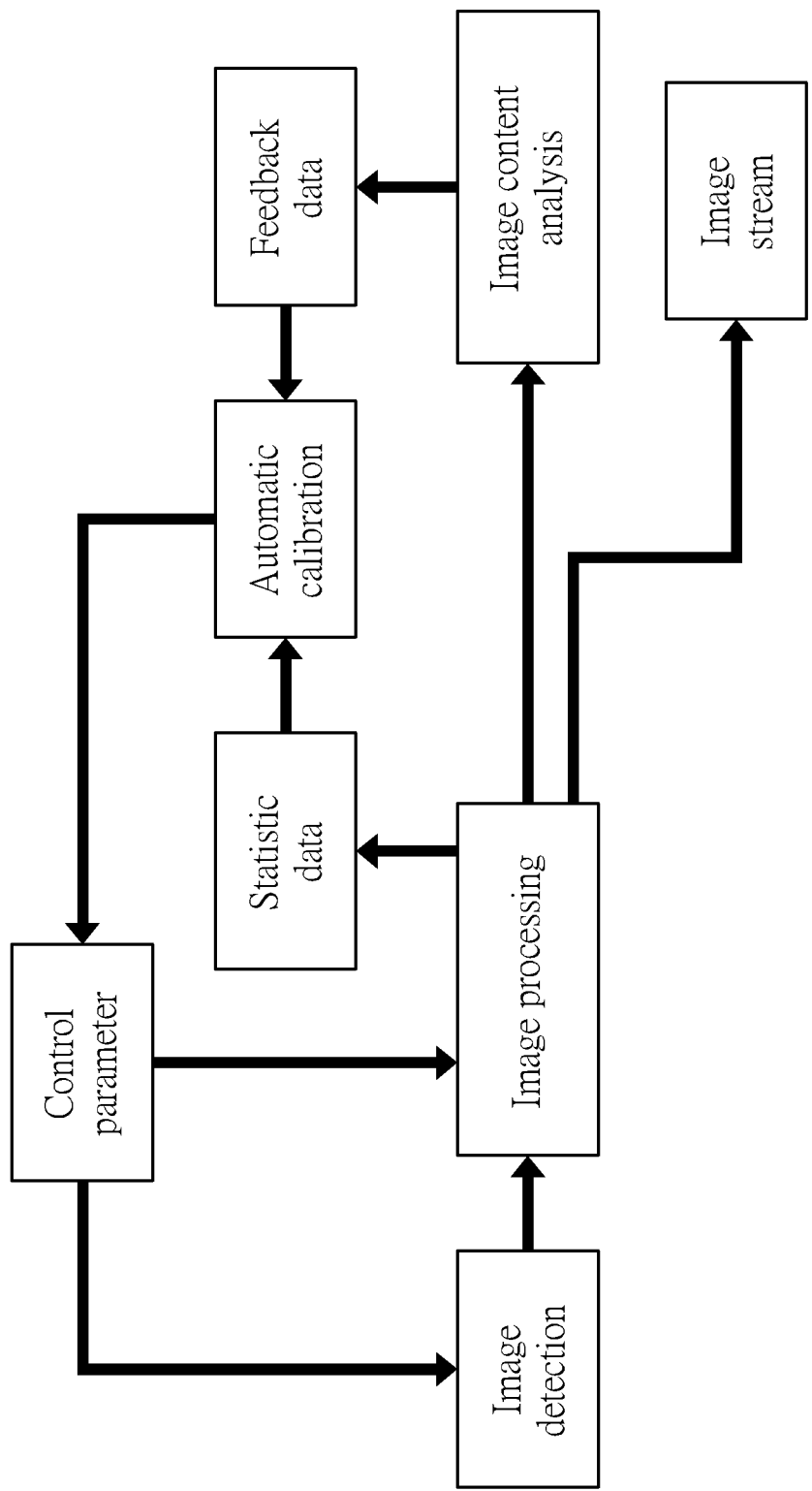
FIG. 4 is a functional block diagram of the image analyzing function according to a second embodiment of the present invention.
Figure 5:
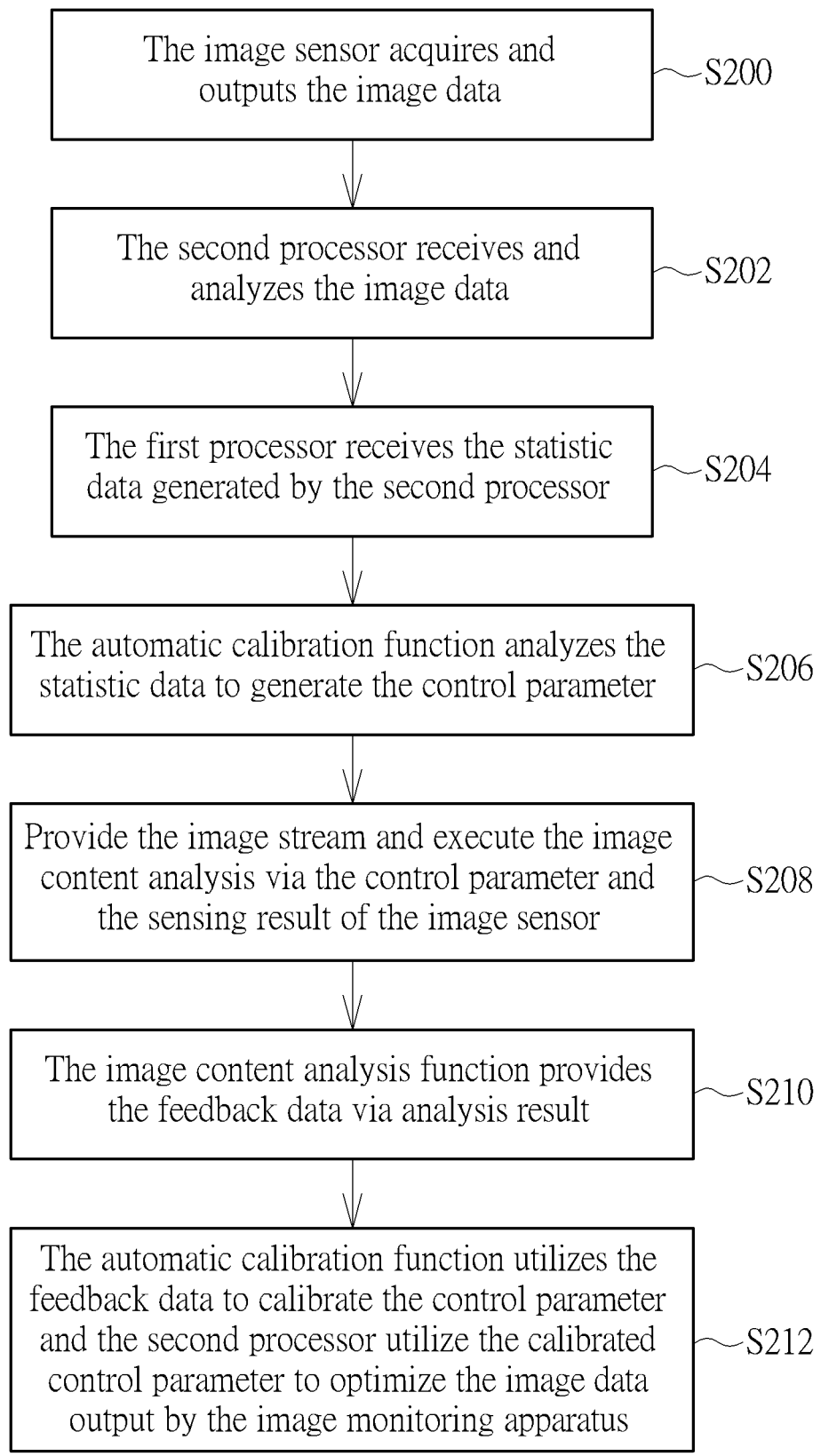
FIG. 5 is a flow chart of the image analyzing method according to the second embodiment of the present invention.

Please refer to FIG. 1, FIG. 4 and FIG. 5. FIG. 4 is a functional block diagram of the image analyzing function according to a second embodiment of the present invention. FIG. 5 is a flow chart of the image analyzing method according to the second embodiment of the present invention. The image analyzing method illustrated in FIG. 5 can be suitable for the image monitoring apparatus 10 shown in FIG. 1. First, the image analyzing method executes steps S200 and S202 that the image sensor 16 can acquire the image data and transmit the image data to the second processor 14 for the image processing. Then, step S204 is executed that the first processor 12 can receive the statistic data generated by the second processor 14 after the image processing. Then, steps S206 and S208 are executed that the first processor 12 can utilize the automatic calibration function to analyze the statistic data and then generate the control parameter. The control parameter can be transmitted to the image sensor 16 and the second processor 14. The second processor 14 can provide the image data for being the image stream and executing the image content analysis according to the control parameter and the sensing result of the image sensor 16.

After that, steps S210 and S212 are executed that the second processor 14 can provide the statistic data for executing the image content analysis, and information analyzed by the image content analysis function can be used as the feedback data, such as metadata of the statistic data, and the feedback data can be provided to the automatic calibration function. The automatic calibration function can analyze the metadata to generate the control parameter, so as to further adjust the image sensor 16 and the second processor 14; the second processor 14 can provide the updated image data for being the image stream and the image content analyzing result, which means image content of the image data can be adjusted for optimization. For example, the image content analysis function may execute human face or human body detection/analysis, and adjust specific parameters (such as weighting or illumination) about a region of interest within the image data according to the detection/analysis result, which means the foresaid image content analysis. Therefore, the automatic calibration function can specifically adjust the control parameter about the region of interest, and the image content analysis can accurately grab features of the human face or the human body within the image data when the human face or human body detection/analysis is executed.

Figure 6:
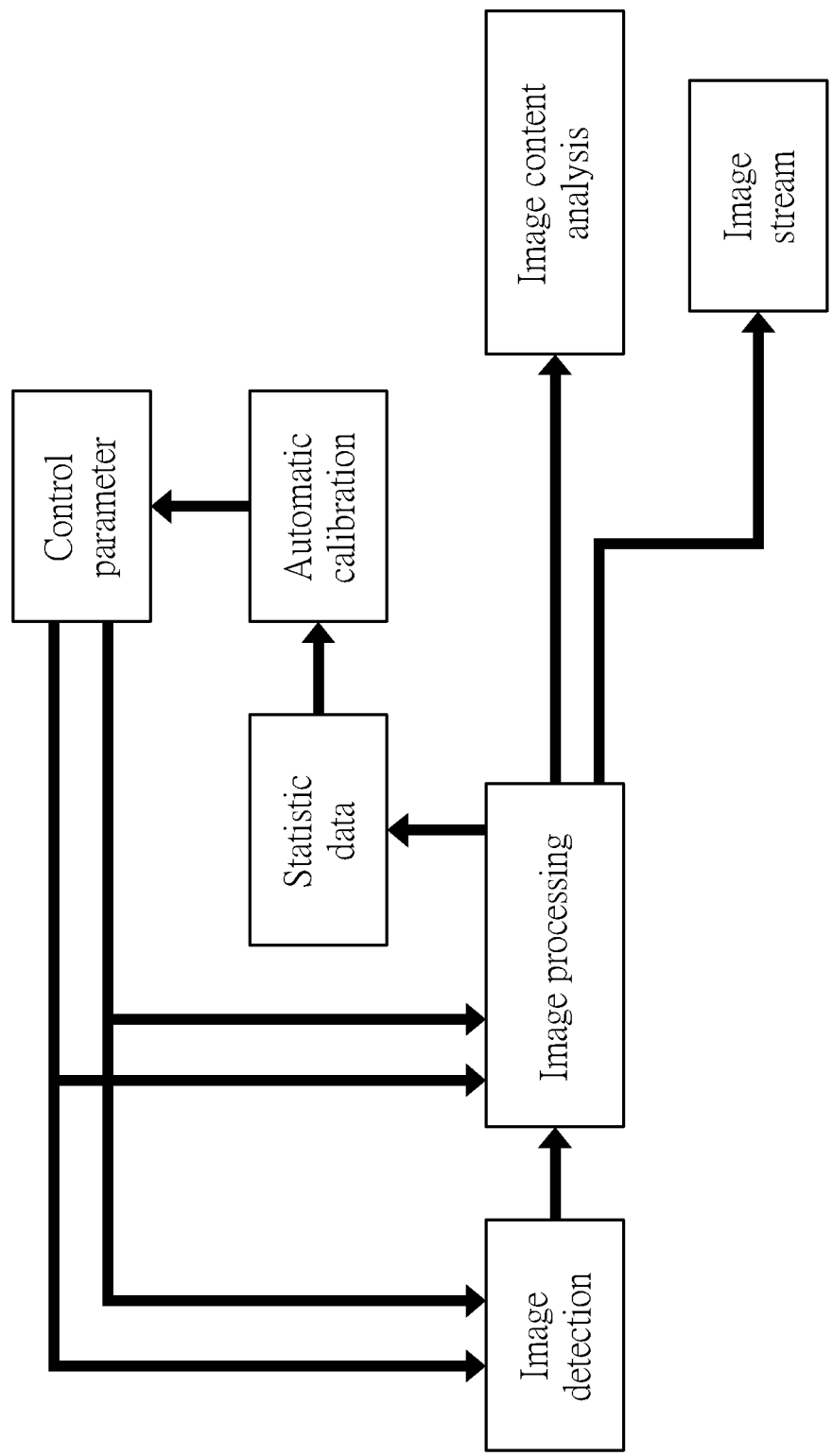
FIG. 6 is a functional block diagram of the image analyzing function according to a third embodiment of the present invention.
Figure 7:
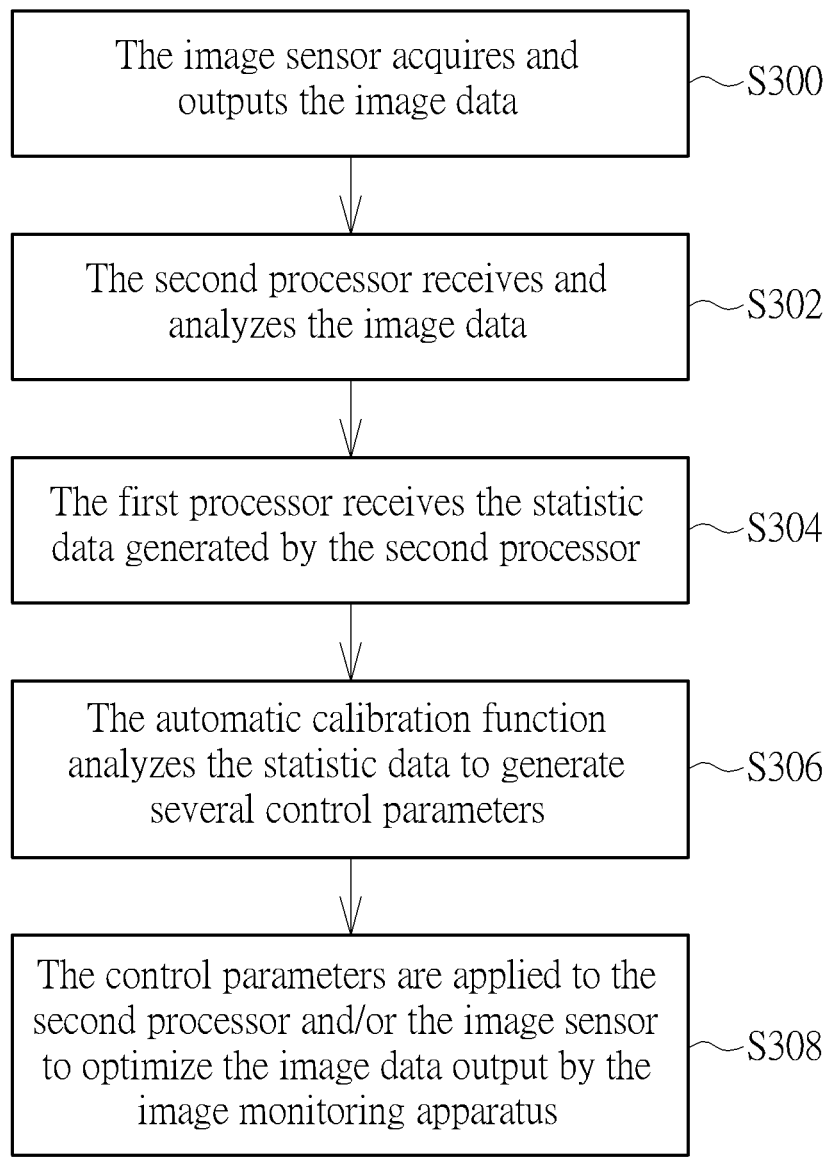
FIG. 7 is a flow chart of the image analyzing method according to the third embodiment of the present invention.

Please refer to FIG. 1, FIG. 6 and FIG. 7. FIG. 6 is a functional block diagram of the image analyzing function according to a third embodiment of the present invention. FIG. 7 is a flow chart of the image analyzing method according to the third embodiment of the present invention. The image analyzing method illustrated in FIG. 7 can be suitable for the image monitoring apparatus 10 shown in FIG. 1. First, the image analyzing method executes steps S300 and S302 that the image sensor 16 can acquire the image data and transmit the image data to the second processor 14 for the image processing. Then, step S304 is executed that the first processor 12 can receive the statistic data processed by the second processor 14 after the image processing. Then, steps S306 and S308 are executed that the first processor 12 can utilize the automatic calibration function to analyze the statistic data for generating a plurality of control parameters. The second processor 14 and/or the image sensor 16 can respectively utilize the plurality of control parameters to generate the related image stream and execute the related image content analysis.

For example, the automatic calibration function can generate a first set of control parameters applied for the image stream, and a second set of control parameters applied for the image content analysis. The image stream can be watched by the user, so that the parameter settings, such as the brightness, the image contrast and the edge sharpness, make the image be soft and colorful; the control parameters are set on the premise that the user needs preferred image quality, and the image stream can be adjusted via the control parameters and then displayed on the displaying unit. The image content analysis can be defined as systematically automatic analysis, so that the parameters, such like the brightness, the image contrast and the edge sharpness, can be kept as initial setting, or specifically adjusted to the image setting suitable to the image content analysis for achieving the preferred image analysis efficiency. Thus, the second processor 14 and the image sensor 16 can utilize the first set of control parameters to provide the image data for being the image stream, and further utilize the second set of control parameters to provide the image data for executing the image content analysis.

In the third embodiment, if the image monitoring apparatus 10 includes one second processor 14, the second processor 14 can utilize a plurality of control parameters to respectively generate a plurality of image data in different points of time via time slice technique. For example, the second processor 14 may utilize one control parameter to generate the related image data at a point of time, and then utilize another control parameter to generate the related image data at a following point of time, which means the plurality of control parameters is applied by turns; in addition, the second processor 14 may utilize the first set of control parameters to generate the related image data at one period of time for being watched by the user, and further utilize the second set of control parameters to generate the related image data at another period of time for executing the image content analysis. If the image monitoring apparatus 10 includes several second processors 14, the second processors 14 can utilize different control parameters to respectively generate the image data, which are individually related to the corresponding control parameter.

Generally, the image monitoring apparatus 10 includes one image sensor 16, so the image sensor 16 can acquire and divide image frames into several groups. The image frames in different groups can be respectively applied for the sets of control parameters, so as to generate the plurality of image data with different control parameters. For example, the image sensor 16 may apply the first set of control parameters for one image frame, and then apply the second set of control parameters for the following image frame, which means the image frames are applied for different sets of control parameters by turns. Besides, the image sensor 16 may apply the first set of control parameters for one set of continuous image frames, and further apply the second set of control parameters for another set of continuous image frames, which means different sets of continuous image frames are alternately applied by the first set of control parameters and the second set of control parameters; each set of continuous image frames has two or more than two image frames, and the said one set of continuous image frames is in a sequence before or after the said another set of continuous image frames. Therefore, the image analyzing method of the present invention can not only satisfy the preferred image observation efficiency, but also provide the accurate image content analysis result. The image monitoring apparatus 10 may include several image sensors 16, which are respectively applied for different control parameters to generate the image data corresponding to the related control parameter.

In other possible situations of the third embodiment, the automatic calibration function in step S306 may optionally generate several sets of control parameters according to the statistic data and a predefined condition. The predefined condition can be a sieving condition automatically generated by the image monitoring apparatus 10, such as the feedback data transformed from the statistic data via the image content analysis function and/or the automatic calibration function. The sieving condition may be manually input by the user; for example, the user can watch the image content displayed on the displaying unit and directly draw a region of interest on the displaying unit as being the sieving condition, or can adjust a dimension or position about the region of interest as being the sieving condition. The statistic data can be sieved by the above-mentioned two ways to generate the control parameter conforming to the actual demand, so as to increase the image quality and/or the accuracy of the image content analysis.

Figure 8:
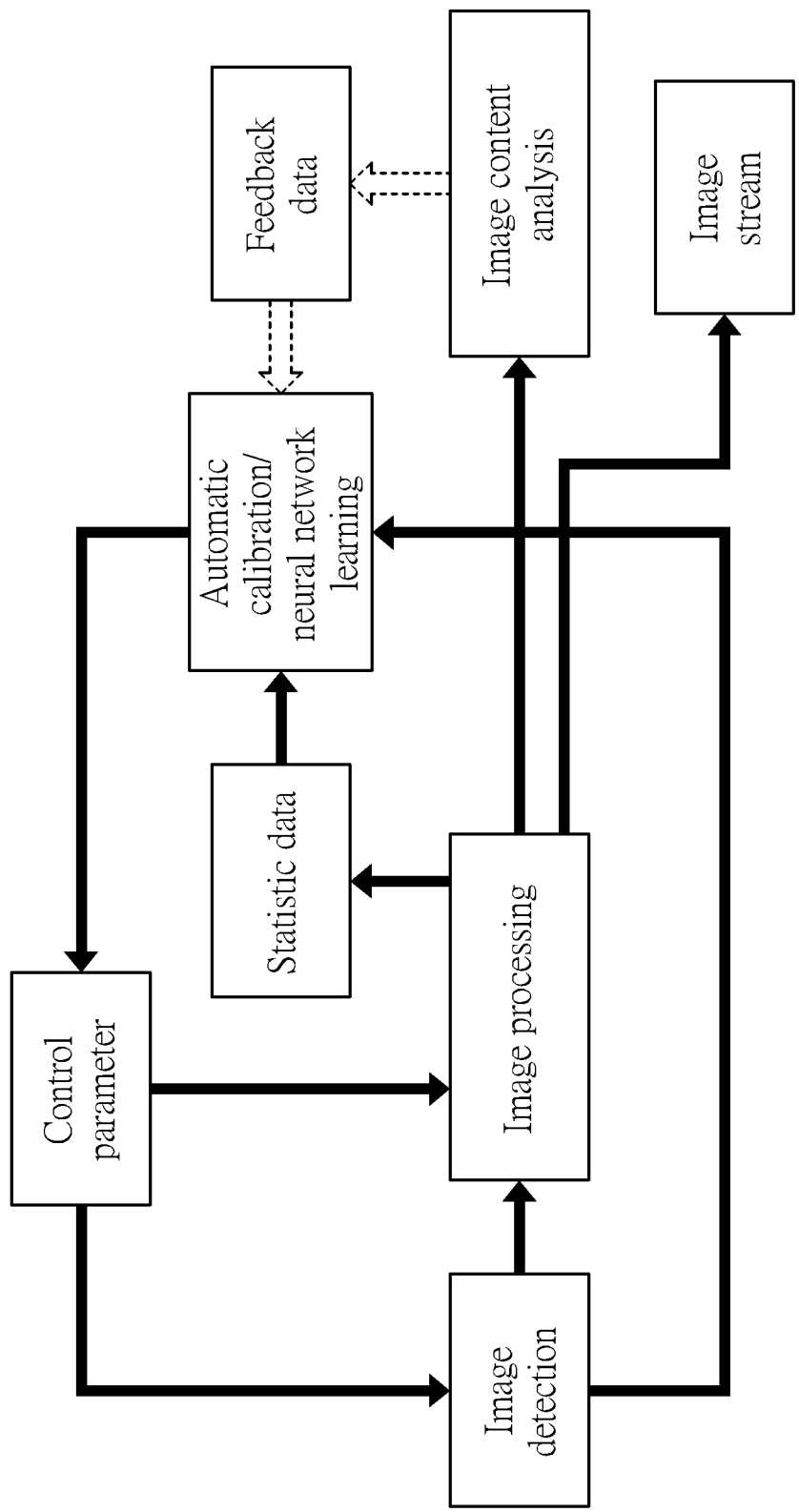
FIG. 8 is a functional block diagram of the image analyzing function according to a fourth embodiment of the present invention.
Figure 9:
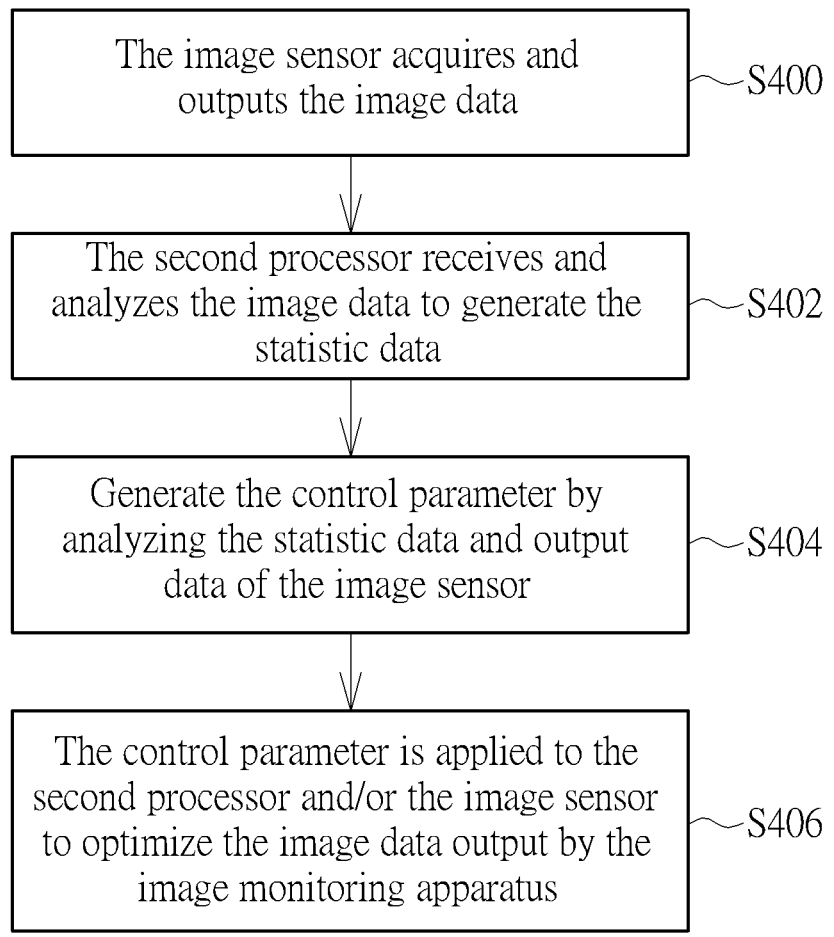
FIG. 9 is a flow chart of the image analyzing method according to the fourth embodiment of the present invention.

Please refer to FIG. 1, FIG. 8 and FIG. 9. FIG. 8 is a functional block diagram of the image analyzing function according to a fourth embodiment of the present invention. FIG. 9 is a flow chart of the image analyzing method according to the fourth embodiment of the present invention. The image analyzing method illustrated in FIG. 9 can be suitable for the image monitoring apparatus 10 shown in FIG. 1. First, the image analyzing method executes steps S400 and S402 that the image sensor 16 can transmit the image data to the second processor 14 for the image processing, and the second processor 14 can generate the statistic data via the image processing. Then, steps S404 and S406 are executed that the image analyzing method can analyze the statistic data and/or output data of the image sensor 16 to generate the control parameter, and the control parameter can be transmitted to the image sensor 16 and the second processor 14 for optimizing the image data output by the image monitoring apparatus 10, so as to generate the image stream and execute the image content analysis.

In step S404, the image analyzing method can utilize the automatic calibration function or a neural network learning function to analyze the statistic data and the output data. The automatic calibration function in all embodiments of the present invention can include, but not be limited to, an automatic exposure function, an automatic focusing function and an automatic while balancing function. The neural network learning function can have the one-layer learning network or the multi-layer learning network. The one-layer neural network learning function can directly analyze the image content according to a purpose of the image data output by the image monitoring apparatus 10; for instance, the image data mentioned in the foresaid embodiments may be used as the image stream watched by the user or used to execute the image content analysis by the first processor 12. The multi-layer neural network learning function can classify the image data via scenes, such as the daytime scene, the night scene, the outdoor scene and the indoor scene. The scenes can respectively have specific parameter setting. For example, the multi-layer neural network learning function can determine a scene category of the image content via classification, and then choose the appropriate parameter setting applied to the image content in accordance with a purpose related to the scene category determined by the former-layer learning network for the continuous image content analysis, so as to acquire the accurate image content analysis result.

In other possible situations of the fourth embodiment, the image content analysis function can optionally provide the feedback data to the automatic calibration function or the neural network learning function; meanwhile, the image analyzing method can utilize the automatic calibration function or the neural network learning function to analyze at least one or some of the statistic data, the output data of the image sensor 16, and the feedback data for generating the control parameter. For example, when the image content analysis function executes the human face or human body detection, the image content analysis function does not generate the feedback data if the region of interest within the initial image data does not detect the human face or the human body, and the image analyzing method can only analyze the statistic data and the output data of the image sensor 16 to generate the control parameter. If the region of interest within the following image data detects the human face or the human body, the image content analysis function can provide the feedback data (such as position and sizes of the human) to the image analyzing method for generating the appropriate control parameter, so as to increase the accuracy of the image content analysis.

In conclusion, the image monitoring apparatus and the image analyzing method of the present invention can utilize the specific algorithm to provide the feedback data in the automatically generating manner or in the manually inputting manner. The specific algorithm can include, but not be limited to, the automatic calibration function and the image content analysis function, so that the image sensor and the image processing unit can refer to the scene or the light source or any external environmental factors when analyzing the image content, and provide different image quality in accordance with the actual demands. The present invention can not only increase the accuracy of the image content analysis, but also improve the quality of the image stream watched by the user. The above-mentioned four embodiments can be intermixed with each other or applied individually; a combination of the four embodiments depends on the actual demand, and a detailed description is omitted herein for simplicity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analyzing method of increasing analysis accuracy and applied to a first processor of an image monitoring apparatus, the image monitoring apparatus comprising a second processor and an image sensor, the image analyzing method comprising:

the second processor receiving image data from the image sensor and processing the image data to acquire statistic data by referring to an external environmental factor;

the first processor receiving the statistic data from the second processor;

the first processor transforming the statistic data into feedback data via specific algorithm for optimal adjustment of image content analysis output by the image monitoring apparatus; and the first processor generating a control parameter according to the feedback data and utilizing the control parameter to control at least one of the second processor and the image sensor for optimizing the image content analysis.

2. The image analyzing method of claim 1, wherein the specific algorithm provides an automatic calibration function, the automatic calibration function normalizes the statistic data to acquire the feedback data, an image content analysis function of the first processor utilizes the feedback data to acquire a setting adjustment value as being the control parameter, and the control parameter is adapted to dynamically adjust parameter setting of the image content analysis function.

3. The image analyzing method of claim 1, wherein the specific algorithm provides an image content analysis function, the image content analysis function acquires metadata of the statistic data to be the feedback data, and an automatic calibration function of the first processor utilizes the metadata to generate the control parameter for adjusting image content of the image data.

4. The image analyzing method of claim 1, wherein the image analyzing method further generates a plurality of control parameters adapted to respectively optimize a plurality of image data output by the image monitoring apparatus, the plurality of image data is displayed on a displaying unit of the image monitoring apparatus and further provided to the image monitoring apparatus for image content analysis.

5. The image analyzing method of claim 4, wherein the external electronic unit is a second processor of the image monitoring apparatus, the second processor utilizes the plurality of control parameters to respectively generate the plurality of image data in different points of time via time slice technique.

6. The image analyzing method of claim 4, wherein the external electronic unit is a plurality of second processors of the image monitoring apparatus, the plurality of second processors utilizes the plurality of control parameters to respectively generate the plurality of image data.

7. The image analyzing method of claim 4, wherein the external electronic unit is an image sensor of the image monitoring apparatus adapted to acquire image frames, the image sensor divides the image frames into several groups, and the plurality of control parameters is respectively applied for the several groups to generate the plurality of image data.

8. The image analyzing method of claim 1, wherein the image monitoring apparatus further comprises an image sensor, the image analyzing method analyzes at least one of the statistic data, the feedback data, and output data from the image sensor to generate the control parameter.

9. The image analyzing method of claim 8, wherein the image analyzing method utilizes an automatic calibration function or a neural network learning function to analyze the statistic data, the feedback data, and the output data from the image sensor.

10. The image analyzing method of claim 9, wherein the neural network learning function has a one-layer learning network or a multi-layer learning network, the one-layer learning network executes image analysis according to a purpose of the image data, the multi-layer learning network classifies the image data via scenes and executes the image analysis according to a purpose of a classification result.

\* \* \* \* \*